United States Patent [19]

Megregian et al.

[11] Patent Number: 4,971,270
[45] Date of Patent: Nov. 20, 1990

[54] MOUNTING STRUCTURE FOR VEHICLE RADIO AMPLIFIER

[75] Inventors: Richard Megregian, Farmington Hills; Jeffrey M. Deneweth, Mt. Clemens, both of Mich.

[73] Assignee: Chrysler Corporation, Highland Park, Mich.

[21] Appl. No.: 465,287

[22] Filed: Jan. 16, 1990

[51] Int. Cl.$^5$ .......................... G12B 9/00; B60R 11/02
[52] U.S. Cl. ................... 248/27.1; 248/224.4; 248/225.2; 248/220.4
[58] Field of Search ............... 248/225.2, 224.4, 220.2, 248/227, 27.1, 220.4; 224/42.45

[56] References Cited

U.S. PATENT DOCUMENTS

| | | | |
|---|---|---|---|
| 4,824,061 | 4/1989 | Sumikama | 248/225.2 |
| 4,913,382 | 4/1990 | Van Acker | 248/27.1 |
| 4,930,696 | 6/1990 | Van Acker | 224/42.45 |

*Primary Examiner*—Reinaldo P. Machado
*Attorney, Agent, or Firm*—Edward A. Craig

[57] ABSTRACT

A mounting structure for attachment of an electrical device on a vertical or obliquely angled vehicle surface. The surface is formed by a sheet material of predetermined thickness having a spaced pair of surfaces for defining bores therein. The mounting structure includes a mounting base plate adapted for attachment to an electrical device which is to be mounted to the surface. The base plate includes a plurality of mounting flange portions extending therefrom for mating with the surface. At least two of the plurality of mounting flange portions include transversely extending clip members spaced for engagement of the bores. Each of the clip members includes a first flange extending perpendicularly from the mounting flange portion. The first flange has portions formed therein defining a cutout portion. The cutout portion includes a ramp surface which leads to a terminal surface at a predetermined distance from the mounting flange. A second flange extends transversely from the first flange and along the ramp surface. The second flange includes a terminal edge adjacent the terminal surface of the ramp surface. The second flange forms a space between the mounting flange portion and the terminal edge. The space thereby defined is less than the thickness of the sheet material such that the ramp and associated surfaces of the second flange engages the sheet material with an interference fit thereby holding the flange securely to the vehicle surface.

11 Claims, 2 Drawing Sheets

MOUNTING STRUCTURE FOR VEHICLE RADIO AMPLIFIER

BACKGROUND

1. Technical Field

The present invention relates to a mounting structure for attaching a vehicle radio amplifier to a vertical panel or obliquely angled panel of a vehicle.

2. Description of Related Art

Due to space constraints under the dash of new vehicles it has increasingly been important to provide alternate locations for mounting of electrical components of vehicle radios such as amplifiers and the like. In recent years it has become advantageous to mount such amplifiers in the trunk of the vehicle in order to save space under the dashboard of the vehicle. While these amplifiers are commonly mounted in a horizontal position, it would be advantageous to provide a mounting system which could be utilized for mounting an amplifier on a vertical surface or the underside of a surface which is obliquely angled to the horizontal.

The wall of the trunk which separates the passenger compartment from the trunk portion is a suitable location for mounting such units in normally unused trunk space. However, this wall is commonly angled at an oblique angle such that the surface is slanted inboard into the passenger's compartment complementing the slant of the back seat of the vehicle. Thus, in the past it has been problematic in mounting amplifiers in such a location in that it would be hard for the installer or production worker to line up the mounting holes for fasteners to secure the flanges of the amplifier to such an oblique surface.

Therefore, it has been a goal in the art to provide a mounting structure for initially hanging the amplifier onto a vertical or oblique panel in order to provide ease of mounting of the amplifier to such a panel. It additionally has been a goal in the art to provide such a mounting structure whereby rattling due to loosening of the fasteners holding the mounting assembly is reduced.

SUMMARY OF THE INVENTION

According to the present invention there is provided a mounting structure for attachment of an electrical device on a vertical or obliquely angled vehicle surface. The surface is formed by a sheet material of predetermined thickness having a spaced pair of surfaces for defining bores therein. The mounting structure includes a mounting base plate adapted for attachment to an electrical device which is to be mounted to the surface. The base plate includes a plurality of mounting flange portions extending therefrom for mating with the surface. At least two of the plurality of mounting flange portions include transversely extending clip members spaced for engagement of the bores. Each of the clip members includes a first flange extending perpendicularly from the mounting flange portion The first flange has portions formed therein defining a cutout portion. The cutout portion includes a ramp surface which leads to a terminal surface at a predetermined distance from the mounting flange. A second flange extends transversely from the first flange and along the ramp surface. The second flange includes a terminal edge adjacent the terminal surface of the ramp surface. The second flange forms a space between the mounting flange portion and the terminal edge. The space thereby defined is less than the thickness of the sheet material such that the terminal edge of the second flange engages the sheet material with an interference fit thereby holding the flange securely to the vehicle surface.

An advantage of the present invention is that the radio can be hung by an installer onto the vehicle surface and is self-supporting in this position such that fasteners can be used to easily secure the mounting flange. Another advantage of the present invention is that the interference fit provided by the clip configuration reduces rattling tendencies of the flange, thereby creating an improved final mounting of the radio amplifier.

Other advantages of the present invention will be readily appreciated as same becomes better understood in light of the following description when taken in connection with accompanying drawings.

BRIEF DESCRIPTION OF THE PREFERRED EMBODIMENT

Figure 1:
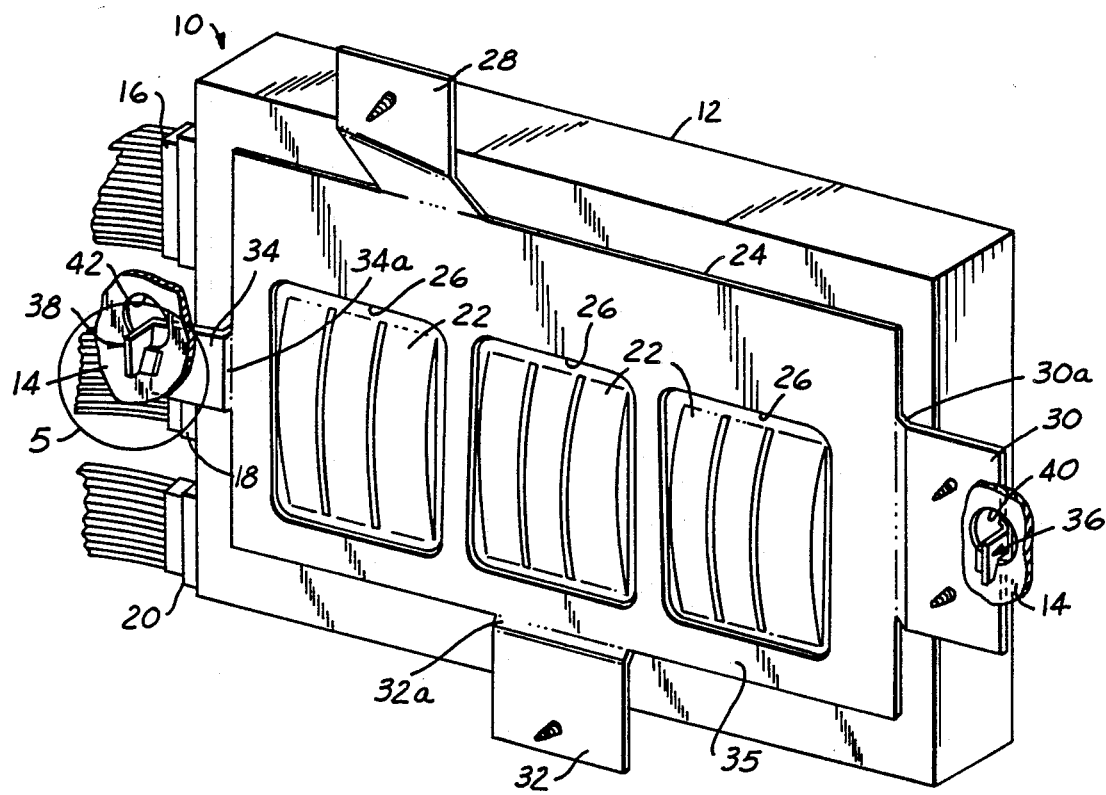
FIG. 1 is a perspective view of the mounting flange of the present invention in its operative environment.

In accordance with the present invention there is provided a mounting structure, generally shown at 10, for mounting of an electronic device such as an amplifier unit 12 to a vertical or obliquely angled panel 14. The radio amplifier includes connections 16, 18 and 20 which provide power input and output connections to the amplifier. Amplifier 12 includes cooling vents 22 for cooling of the amplifier 12.

The mounting structure 10 of the present invention includes a base plate 24 which is connected to the amplifier 12 by way of fasteners such as screws, rivets, welding or the like. Base plate 24 includes cutouts 26 for allowing clearance for the cooling vents 22 of the amplifier 12. The base plate 24 includes mounting flanges 28, 30, 32 and 34. The mounting flanges 30, 32 and 34 include step portions 30a, 32a and 34a which operate to slightly space the main body portion 35 of base plate 24 from the panel 14 to which it is mounted to provide a suitable space for the cooling vents to extend. The flanges conform to the vehicle panel 14 to mount flush with the panel 14. At least two of the flange members include transversely extending clip members 36 and 38. In a preferred embodiment the clip members 36 and 38 are located on horizontally spaced opposite flange portions 30 and 34.

The vehicle panel 14 includes surfaces having bores 40 and 42 provided therein. The bores 40 and 42 and clips 36 and 38 are equally spaced to allow clips 36 and 38 to pass through the bores 40 and 42.

Figure 5:
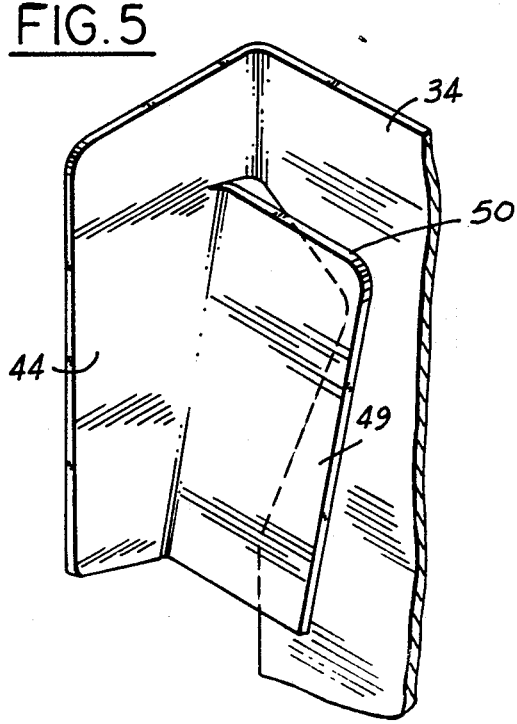
FIG. 5 is an enlarged fragmentary detailed perspective view of a utilized in the present invention.
Figure 6:
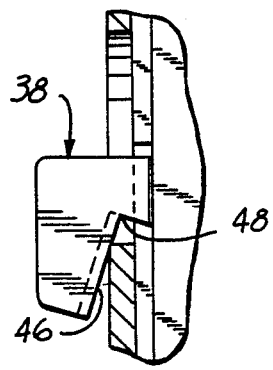
FIG. 6 is a side view of the clip member of FIG. 5.
Figure 7:
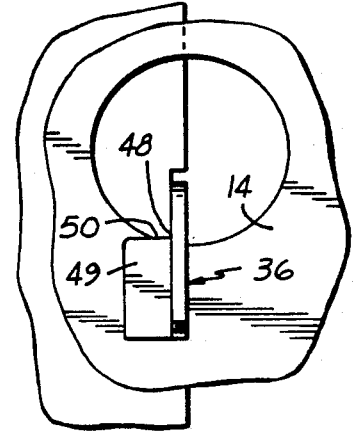
FIG. 7 is a detailed plan view of a clip member of the present invention engaging a panel of a vehicle.
Figure 2:
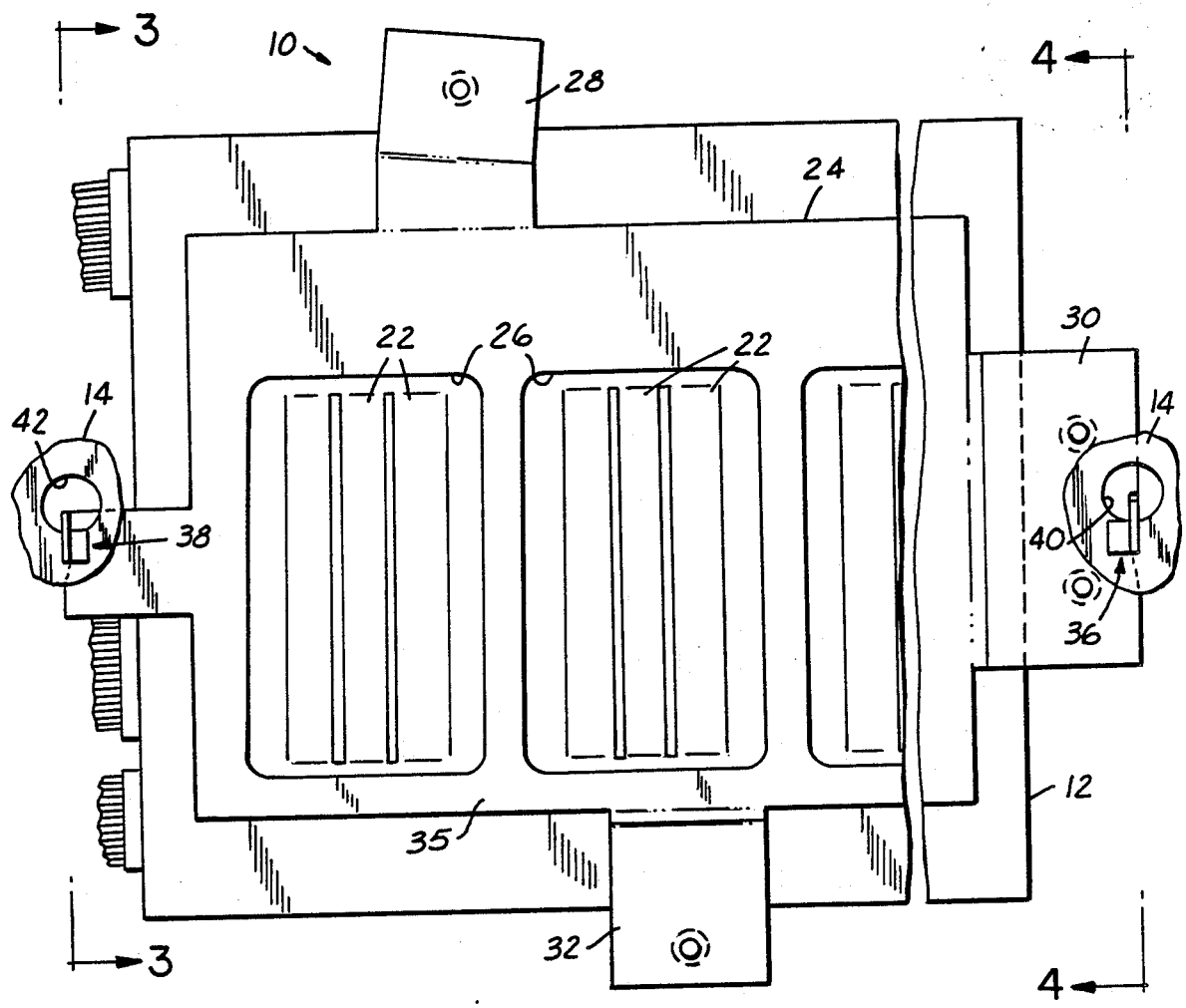
FIG. 2 is a elevational view partially broken away of the mounting structure of the present invention.

Referring now to FIGS. 5 through 7, the clip members 36 and 38 each include a first flange portion 44 extending generally perpendicularly to the mounting flange 34. A cutout portion defines a ramp surface 46 which has an inner terminal end 48, as shown in detail in FIG. 6. A second flange portion 49 extends along the ramp surface 46 perpendicularly to the first flange 44 and has a terminal edge 50 adjacent the terminal end 48 to define a gap between the mounting flange 34 and the terminal edge 50 which is less than the thickness of the sheet material forming panel 14. Thus, the second flange engages the panel 14 in an interference fit between the ramp surfaces 46 including associated flange 49 and the mounting flange 34. This holds the flange securely to the vehicle surface and acts to prevent rattling.

In a preferred embodiment the bores 40 and 42 are cylindrical and must be of a size which will allow the clips 36 and 38 to pass through. Additionally, because of the slanted opening formed at the base of the cylindrical bores the terminal edge 50 of second flange 49 overlaps the panel adjacent the lower end of the respective bore and is slightly deflected to ensure engagement of the panel material. Thus, while cylindrical bores are shown other shapes of bores which include slanted edges at the lower ends, such that the flange will extend out of the bore and overlap onto the panel material adjacent the lower end of the bore, may be utilized.

Figure 3:
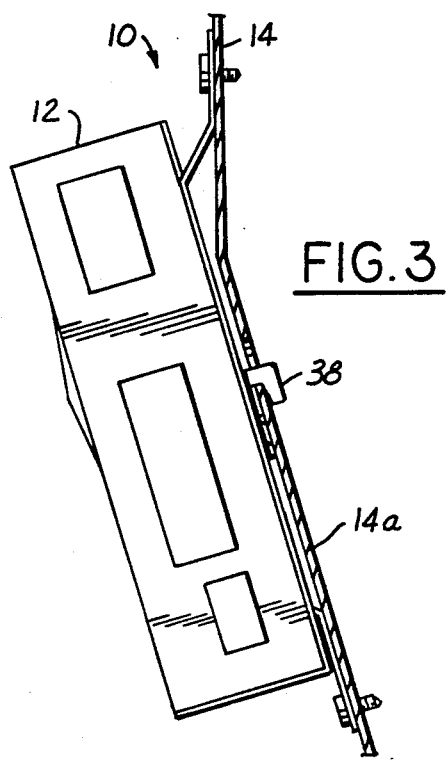
FIG. 3 is a sectional view taken along line 3—3 of FIG. 2.
Figure 4:
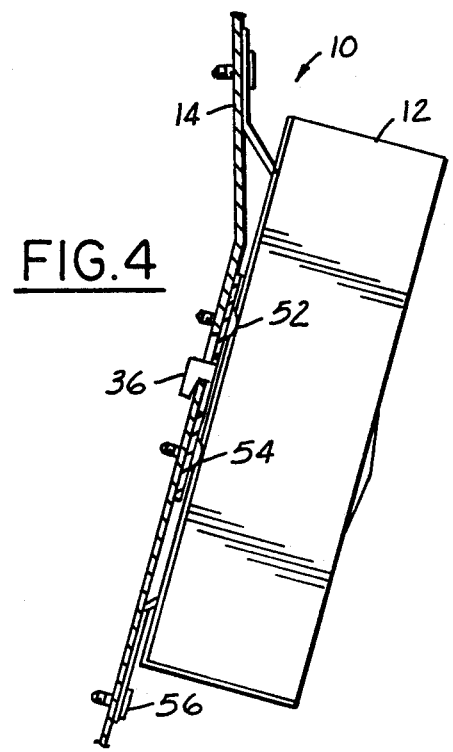
FIG. 4 is a sectional view taken along line 4—4 of FIG. 2.

Referring now to FIGS. 3 and 4, in operation, the panel 14 is generally a sheet metal panel which divides the passenger compartment from the trunk of the vehicle. Thus, generally the panel 14 includes an obliquely angled surface 14a which jets into the trunk at an oblique angle such that the amplifier is hung off and under the back wall, as shown in FIGS. 3 and 4. Thus, panel 14 includes an oblique surface 14a which is angled to the horizontal.

The installer of the amplifier unit merely has to insert the clips 36 and 38 into the holes 40 and 42 and allow the weight of the unit itself or manually apply slight downward pressure to seat clips 36 and 38 on panel 14. The respective inclined ramps 46 and associated flanges of clips 36 and 38 will operate to clean the generally planar surfaces of flanges 36 and 38 into abutting engagement with the opposed surface of panel 14. The application of a slight downward pressure will assure an interference fit between respective flanges 30, 34 clips 36, 38 and the respective portions of panel 14 as well as moving the openings provided in each of the respective flanges 28, 30, and 32 into alignment with respective openings provided in panel 14. Thus, clips 36 and 38 will hold the amplifier 12 in place while fasteners 52, 54, 56, and 58 are added through the prealigned holes.

The advantage of the present invention is that the mounting flange is held in place while fasteners are easily secured to the vehicle panel. Additionally, the interference fit of the vehicle panel provided for by the clips of the present invention allows for the absence of fasteners at flange 34 which saves costs in both materials and labor during production and assembly. Additionally, the clip configuration of the present invention resists rattling of the mounting bracket, should any of the fasteners loosen up over time.

While the above description constitutes the preferred embodiment of the present invention, it is to be appreciated that the invention is susceptible to modification, variation and change without departing from the proper scope and fair meaning of the accompanying claims.

What is claimed is:

1. In a mounting structure for mounting an electronic amplifier to a vertical or obliquely angled panel of a vehicle, the panel having a predetermined thickness and including a pair of spaced bores therein having a slanted surface at the lower ends of the bore, the mounting structure being attached to said amplifier and including flanges extending therefrom adapted for secure attachment to the vehicle panel, a pair of the flanges extending from the mounting structure at locations which are proximate the bores in the panel during mounting thereof, a clip structure comprising:

a pair of clip members extending transversely from said pair of flanges, said pair of clip members spaced so as to pass through the bores in the vehicle panel, each of said clip members including a first flange extending transversely from a flange of the pair of flanges and having portions forming a cutout portion thereby defining a ramp surface on said first flange, a second flange extending transversely from the first flange and along said ramp surface, said second flange including a terminal edge parallel to the mounting flange and spaced from the mounting flange at a distance less than the predetermined thickness of the vehicle panel, whereby said mounting flange may be hung on said panel by inserting said pair of clip members into the bores and lowered such that the panel is engaged in an interference fit between the mounting flange and said ramp surface of said second flange.

2. The mounting structure of claim 1 wherein said clip members are horizontally spaced.

3. The mounting structure of claim 2 wherein one of the pair of flanges is fastened to the vehicle panel by fasteners and the other of the pair of flanges is secured solely by the clip member engaging the vehicle panel.

4. The mounting structure of claim 1 wherein the mounting structure includes a cutout portion for allowing a cooling vent of the amplifier to extend therethrough.

5. The mounting structure of claim 4 wherein the pair of flanges include a stepped portion for spacing of the mounting structure from the vehicle panel to provide clearance for said cooling vent of the amplifier.

6. A mounting structure for attachment of a device on a vertical or oblique vehicle surface, said vehicle surface being defined by a sheet material of a predetermined thickness having a pair of spaced cylindrical bores therein, said mounting structure comprising:

a mounting base plate adapted for attachment to said device to be mounted on said surface, said base plate having a plurality of mounting flange portions extending therefrom for mating with the surface, at least two of said plurality of mounting flange portions including transversely extending spaced clip members for engagement with said bores, each of said clip members including a first flange extending from each of the said mounting flange portions and having portions formed therein defining a cutout portion having a ramp surface leading to a terminal surface spaced from said mounting flange at a predetermined distance; a second flange extending along said ramp surface perpendicularly to said first flange, said second flange having a terminal edge adjacent the terminal surface, said second flange thereby forming a space between the mounting flange portion and the terminal edge which is less than the thickness of the sheet material such that the second flange engages the sheet material with an interference fit thereby holding each mounting flange portion securely to the surface.

7. The mounting structure of claim 6 wherein said clip members are horizontally aligned on said mounting flange portions for entering horizontally spaced bores in said panel.

8. The mounting structure of claim 7 wherein one of said mounting flange portions having a clip member extending therefrom is fastened to the vehicle panel by fasteners and the other is secured by said clip member engaging the vehicle panel.

9. The mounting structure of claim 6 wherein said base plate further includes a cutout portion for allowing a cooling vent of the amplifier to extend therethrough.

10. The mounting structure of claim 9 wherein said mounting flanges include a stepped portion for spacing of said mounting base plate from the vehicle panel to provide clearance for a cooling vent of the amplifier.

11. A mounting structure in combination with an amplifier for a vehicle radio, said amplifier including a box container formed of a top wall, four side walls and a bottom wall, the bottom wall including a plurality of air cooling vents extending therefrom said mounting structure comprising: a mounting base plate, said mounting base plate having cutout portions, said base plate being attached to said amplifier, said cooling vents extending through the cutout portions, said base plate including a plurality of integrally formed mounting flanges extending therefrom, said mounting flanges including means for spacing the base plate from a panel surface of a vehicle during mounting to the panel for allowing clearance for said cooling vents of said amplifier, at least two of said plurality of mounting flange portions including integrally formed transversely extending clip members spaced for engagement of preexisting bores in the vehicle panel, each of said clip members including a first flange extending perpendicularly from the mounting flange, said first flange having portions forming a cutout portion having a ramp surface, said ramp surface being inclined with respect to said mounting flange for forming a space which is wide at its open end and is narrower than the vehicle panel thickness at its closed end, a second flange transversely extending from said first flange along said ramp surface and including a terminal edge extending parallel to the mounting flange defining a space between said mounting flange and said terminal edge which is less than the thickness of the vehicle panel, said amplifier being supported on a vertical or obliquely angled vehicle panel by said terminal edge engaging portions of the vehicle panel adjacent the bores with an interference fit which pulls the mounting flange to the panel.

* * * * *